United States Patent [19]

Voeten, deceased et al.

[11] Patent Number: 4,831,490
[45] Date of Patent: May 16, 1989

[54] ELECTRONIC COMPONENT WITHOUT LEADS, SOLID ELECTROLYTIC CARACITOR AND METHOD OF MANUFACTURING SAME

[75] Inventors: Hendrik Voeten, deceased, late of Herfterlaan; Friedrich Jacobus De Haan, administrator, Dommelen, both of Netherlands

[73] Assignee: U.S. Philips Corporation, New York, N.Y.

[21] Appl. No.: 147,942

[22] Filed: Jan. 25, 1988

Related U.S. Application Data

[63] Continuation-in-part of Ser. No. 34,195, Apr. 6, 1987, abandoned.

[30] Foreign Application Priority Data

Oct. 22, 1986 [NL] Netherlands .................. 8602642

[51] Int. Cl.⁴ .............................................. H01G 9/00
[52] U.S. Cl. ..................................... 361/523; 29/570.1
[58] Field of Search ................... 361/306, 307, 433; 174/52 PE; 338/237; 29/570.1

[56] References Cited

U.S. PATENT DOCUMENTS

| | | | |
|---|---|---|---|
| 2,628,271 | 2/1953 | Brafman | 361/306 |
| 3,155,935 | 11/1964 | Pfister | 174/52 PE X |
| 3,311,967 | 4/1967 | Robinson | 361/306 X |
| 3,345,543 | 10/1967 | Sato | 361/433 A |
| 3,375,413 | 3/1968 | Brill | 361/433 A |
| 3,828,227 | 8/1974 | Millard et al. | 361/433 A |
| 3,855,505 | 12/1974 | Karlik et al. | 361/433 S |
| 4,001,655 | 1/1977 | Voyles et al. | 361/433 C |
| 4,093,972 | 6/1978 | Voyles | 361/433 S |
| 4,613,518 | 9/1986 | Ham et al. | 361/309 X |

FOREIGN PATENT DOCUMENTS

| | | | |
|---|---|---|---|
| 2561034 | 9/1985 | France | 361/306 |
| 960094 | 6/1964 | United Kingdom | 174/52 PE |

*Primary Examiner*—Donald A. Griffin
*Attorney, Agent, or Firm*—Norman N. Spain

[57] ABSTRACT

The invention relates to an electronic component without leads, and in particular to a solid electrlytic capacitor having an insulating case with metal caps at the ends as an envelope, which caps close the case and form electric connection faces.

The electronic component has a long life-cycle and great resistance to temperature changes and to the high temperature which may occur when the component is applied in a wave soldering bath.

3 Claims, 2 Drawing Sheets

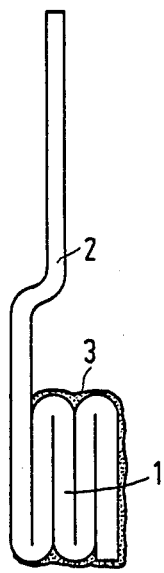
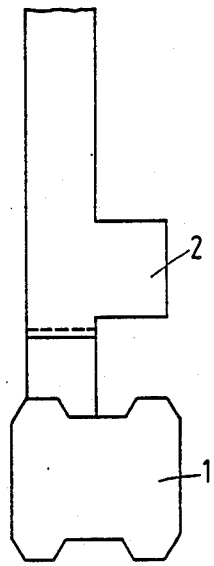
FIG.1a　　　　FIG.1b
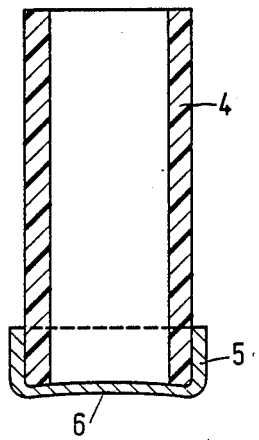
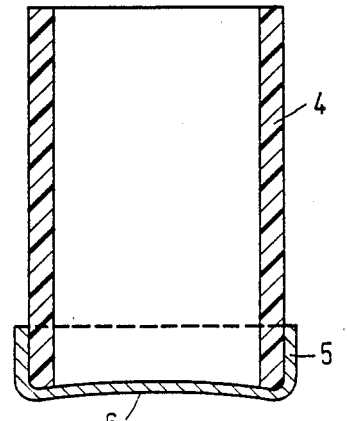
FIG.2a　　　　FIG.2b

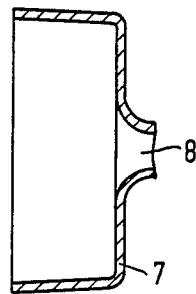
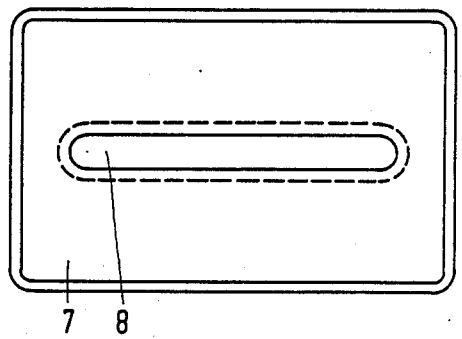
FIG.3a            FIG.3b
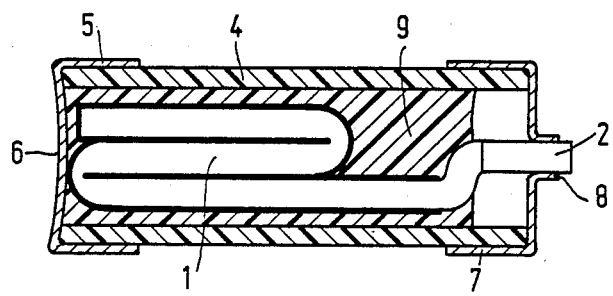
FIG.4a
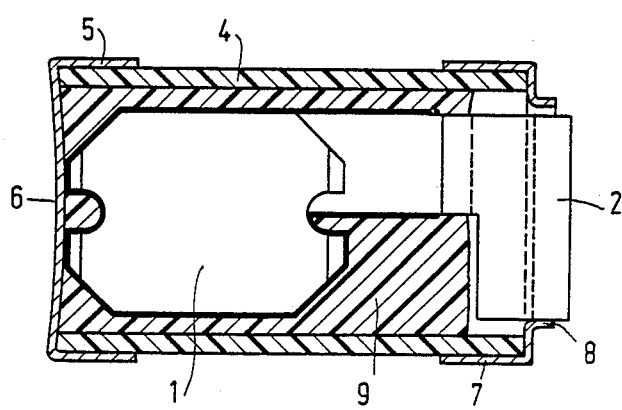
FIG.4b

ELECTRONIC COMPONENT WITHOUT LEADS, SOLID ELECTROLYTIC CARACITOR AND METHOD OF MANUFACTURING SAME

This application is a continuation-in-part of application Ser. No. 034,195, filed Apr. 6, 1987 now abandoned.

The invention relates to an electronic component without leads, comprising an electronic element and an insulating envelope which comprises a case which is provided with electric connection faces at both ends, at least one of the electric connection faces being a metal cap which covers one end of the case.

The invention particularly relates to a solid electrolytic capacitor whose electronic element is provided with an anode tag and an outer conductive layer which forms a cathode surface, and to a method of manufacturing such a solid electrolytic capacitor.

A similar solid electrolytic capacitor is described in, for example, French Patent Application No. FR 2529428, in which the ends of the case are filled with a conductive adhesive which ensures a proper electric connection to the anode tag on one side and to the cathode surface on the other side. The remainder of said case is filled with a non-conductive synthetic resin. The ends of said case are coated with a conductive anti-diffusion layer, for example by means of electrodeposition. In U.S. Pat. No. 3,828,227 a description is given of a solid electrolytic capacitor having a thermoplastic envelope whose ends are covered with metal caps.

The conductive adhesive is a synthetic resin which is excessively loaded with conductive particles. Due to this excess degree of filling, i.e. the particles are in contact with each other, such a conductive adhesive is porous and allows the passage of, for example, water from the surroundings. This adversely affects the life-cycle of an electronic component and in particular that of a (solid) electrolytic capacitor.

The use of an anti-diffusion layer only partly solves this problem and has certain disadvantages because a layer which has been applied by electrodeposition tends to dissolve in a soldering bath. It is to be noted that electronic components without leads, as described herein, are often attached to a printed circuit board by means of a wavesoldering bath.

It is an object of the invention to provide in a readily applicable way an electronic component having a long life-cycle for which reason it must possess a high moisture resistance even when used at varying temperature. An additional object of the invention is to provide an electronic component which can suitably be treated in a wavesoldering process.

This object is achieved in accordance with the invention by an electronic component as described in the opening paragraph, which component is further characterized in that the case is formed of a thermosetting synthetic resin composition, for example a glass fibre-reinforced polyester resin.

Such a material is thermally and mechanically stable at the temperatures which may occur in a wave-soldering bath, and in addition it does not adhere to the solder, so that short-circuits between the terminal faces are prevented. In addition, the material can suitably be provided, for example by means of laser marking, with the neccessary designations concerning specifications of the electronic component. Preferably, the case is of a prismatic shape.

The use of caps at the ends of the case has the additional advantage that the caps also serve as spacers, so that when the electronic component is cemented to a printed circuit board the drop of adhesive used does not spread too far and is suitably dimensioned.

An important example of the component to which the invention relates is a solid electrolytic capacitor having an anode body which is punched from aluminium sheet, etched and folded, and provided with a dielectric oxide layer by electrolytic oxidation, which anode body is covered with a semiconductive oxide layer on which a conductive layer is provided. In this capacitor the terminal points are formed by an anode tag which is integral with the anode body and by the outer conductive layer which forms a cathode surface. In an alternative embodiment of the invention the solid electrolytic capacitor comprises a sintered porous pellet, for example of tantalum, which is impregnated with a semiconductive material and provided with a conductive outer layer.

Such an electronic component only has one terminal lead or tag. When the electronic component is incorporated in a case as described above, for example an electrically conductive adhesive may be used to obtain an electrically conductive connection between said electronic component and a metal cap which is provided at the end of the case. The formation of an electrically conductive connection between the cathode surface and the metal cap by means of a soldering process has the disadvantage that the soldered joint may come loose when the electronic component is afterwards immersed in a soldering bath.

To this end a further object of the invention is to provide a solid electrolytic capacitor in which a reliable electric connection is formed between the cathode surface and a metal cap. The connection must be resistant to changes in temperature and to the high temperature which may occur in a wavesoldering bath.

This object is achieved according to the invention by a solid electrolytic capacitor as described in the opening paragraph, which is further characterized in that the cathode surface is in mechanical and electric contact with a first metal cap on one side of the case, which cap is sealed to the case and curved towards the cathode surface. To obtain a proper seal the cap may, for example, be cemented to the case. The electric connection is obtained, for example, by means of a conductive adhesive which need not seal the case. In order to obtain a properly conductive connection, the inside of the metal cap must not be tin-plated, whereas the outside should preferably be tin-plated to obtain a good solderability.

A metal cap which is produced, for example, by deep drawing will generally have a somewhat convex shape. When the temperature changes this convexity may increase, which may cause the metal cap to become disconnected from the cathode surface. By constructing the cap so that it is curved towards the cathode surface, the cap obtains a somewhat concave shape, thereby ensuring a satisfactory electric connection with the cathode surface in the case of changes in temperature.

A satisfactory electrically conductive connection with an anode tag cannot be obtained by means of a conductive adhesive due to the presence of an oxide film on the aluminium. As described in French Patent Application No. FR 2529428 this problem can be solved with an embodiment in which a wire is welded to the anode tag. As the solid electrolytic capacitor according to the invention is filled with an insulating synthetic resin, the seal or the side of the anode tag has to meet less stringent requirements than the seal on the side of the cathode which is not fully penetrated by the insulating synthetic resin. However, in many cases it is to be preferred to provide a metal cap on both sides of the case because they can for example cooperate as spacers. Preferably, the anode tag is directly connected to the metal cap, i.e. without using a welded wire. In order to obtain a reliable welded joint, with the cap, the joint is preferably formed on the outside of the cap. If the anode tag is welded to the inside of the cap a mechanically weak and unreliable connection is obtained.

A preferred embodiment of the solid electrolytic capacitor is characterized according to the invention in that on the side of the anode a second metal cap is provided with an aperture through which the anode tag is led which has its outside mechanically and electrically connected to the metal cap.

A further object of the invention is to provide a readily applicable method of manufacturing a solid electrolytic capacitor according to the invention, in which an electronic element is produced in a conventional manner, which is provided with an anode tag and a cathode surface.

This object is achieved according to the invention by a method which is further characterized in that an insulating case is provided with a first metal cap which is sealed to the case and which is curved inwards after which the electronic element is arranged in the case so that the cathode surface is in electrically conductive connection with the first metal cap, after which the case is closed with a second metal cap which is provided with an aperture through which the anode tag is led outwards, after which the anode tag is secured to a second metal cap by means of a welded joint, and the case is filled with a filler via a feed opening in the second metal cap.

The welded joint between the anode tag and the second metal cap is obtained, for example, by laser welding, for which reason the tag should prior to the welding operation be cut so that its surface is rough and dull to avoid reflection of the laser beams. Preferably, the spot to be welded is irradiated at an angle which deviates from the normal to avoid damage of the electronic component via the aperture in the metal cap.

The invention will be explained in more detail by means of an exemplary embodiment and with reference to a drawing, in which FIGS. 1a and 1b are a side view and a front view, respectively, of the electronic element of a solid electrolytic capacitor, FIG. 2a and 2b are a side view and a front view, respectively, of sections of an insulating case with a metal cap, FIGS. 3a and 3b are a (sectional) side view and a top view, respectively, of a metal cap having a feedthrough aperture, and in which FIGS. 4a and 4b are a side view and a front view, respectively, of sections of an electronic component according to the invention.

EXAMPLE

FIGS. 1a and 1b show a solid electrolytic capacitor having an anode body 1 which is punched from aluminium sheet, etched and folded, and provided with a dielectric oxide layer by electrolytic oxidation. The body is provided with an anode tag 2.

After the electrolytic oxidation, the production process comprises the impregnation of the folded anode body 1 with a manganese-nitrate solution followed by heating a temperature at which pyrolysis of the manganese nitrate occurs, thereby forming the semiconductive pyrolusite $MnO_2$. Next, a graphite layer and a subsequent outer conductive silver layer are applied. The assembly of layers is indicated by reference numeral 3.

FIGS. 2a and 2b show an insulating case 4 of a thermosetting synthetic resin composition, for example a glass fibre-reinforced polyester having a wall thickness of, for example 0.4 mm. The case 4 is closed on one side by a metal cap which has a curved portion 6. The metal cap 5 is sealed to the case 4, for example by cementing the metal cap to the case. The metal cap is formed of copper plate by deepdrawing and has a thickness of, for example 0.1 mm and is provided on all sides with a 6 to 10 $\mu$um thick lead-tin layer (weight ratio 60:40) having an intermediate nickel layer of 0.5 $\mu$um.

FIGS. 3a and 3b show a metal cap 7 which is provided with a slot-shaped aperture 8, which cap is made of the same material as the metal cap 5.

The solid electrolytic capacitor (1, 2, 3) is arranged in the case 4 so that the outer conductive layer 3 of the assembly is in electrically conductive connection with the first metal cap 5 which is cemented to the case 4, see FIGS. 4a and 4b. In this connection a drop of a conductive adhesive, for example an epoxy resin which is filled with silver particles, is introduced between the cap 5 and the assembly.

Subsequently, the second metal cap 7 is placed on the case 4, so that the anode tag 2 is led through the aperture 8. The part of the anode tag 2 which is superfluous is cut away in such a manner that a dull surface is obtained. The anode tag 2 is laser-welded to the metal cap 7, for example using an yttrium aluminium garnet laser, by means of a 3 J pulse which is directed to a surface area of 0.5 $mm^2$.

Finally, the case 4 is filled with a filler 9 which is introduced via a feed opening (not shown) into the metal cap 7 by means of, for example, an injection needle. If desired, the metal cap 7 may in addition contain a vent aperture to facilitate the filling of the case. Polymeric materials which can suitably be used as filler materials, are for example, epoxy compounds such as diglycidyl ether of bisphenol-A or acrylates.

Other components which may be contacted and enveloped according to the invention are, for example, ceramic or foil capacitors, metal-film resistors and ceramic resistors.

What is claimed is:

1. A leadless solid electrolytic capacitor comprising an electronic element provided with an anode tag and an outer conductor which forms a cathode surface, an insulating envelope which comprises a case for said electronic element, which case is provided with electric connection faces at both ends, at least one of the electric connection faces being a metal cap which covers one end of the case, characterized in that the case is formed of a thermosetting synthetic resin composition and that the cathode surface is in mechanical and electrical contact with a cap covering one end of said case, which cap is sealed to the case and is curved toward the cathode surface.

2. A solid electrolytic capacitor as claimed in claim 1, characterized in that on the side of the anode a second metal cap is provided with an aperture through which the anode tag is led which has its outside mechanically and electrically connected to the metal cap.

3. A method of manufacturing a solid electrolytic capacitor as claimed in claim 1, in which an electronic element which is provided with an anode tag and a cathode surface is produced in a conventional manner characterized in that an insulating case is provided with a first metal cap which is sealed to the case and which is curved inwards, after which the electronic element is arranged in the case so that the cathode surface is in electrically conductive connection with the first metal cap, after which the case is closed by a second metal cap which is provided with an aperture through which the anode tag is led outwards, after which the anode tag is secured to the second metal cap by means of a welded joint, and the case is filled with a filler via a feed opening in the second metal cap.

* * * * *